United States Patent
Boetsch

(10) Patent No.: US 12,495,735 B2
(45) Date of Patent: Dec. 16, 2025

(54) CORN HEAD ROLLER SNOUT ASSEMBLY SET

(71) Applicant: BPB Mediterranea S.A., Villa Maria (AR)

(72) Inventor: Gustavo Alejandro Boetsch, Villa Maria (AR)

(73) Assignee: BPB Mediterranea S.A., Villa Maria (AR)

( * ) Notice: Subject to any disclaimer, the term of this patent is extended or adjusted under 35 U.S.C. 154(b) by 204 days.

(21) Appl. No.: 18/489,136

(22) Filed: Oct. 18, 2023

(65) Prior Publication Data
US 2024/0122116 A1  Apr. 18, 2024

(30) Foreign Application Priority Data
Oct. 18, 2022 (AR) .............................. P20220102831

(51) Int. Cl.
*A01D 43/08* (2006.01)
*A01D 45/02* (2006.01)

(52) U.S. Cl.
CPC ......... *A01D 43/082* (2013.01); *A01D 45/025* (2013.01)

(58) Field of Classification Search
CPC ..... A01D 45/02–45/028; A01D 43/08–43/088
See application file for complete search history.

(56) References Cited

U.S. PATENT DOCUMENTS

| | | | | |
|---|---|---|---|---|
| 1,641,436 A | * | 9/1927 | Jett ........................ | A01D 45/025 460/36 |
| 1,827,216 A | * | 10/1931 | Synck .................. | A01D 45/025 56/104 |
| 2,678,526 A | * | 5/1954 | Voss ...................... | A01D 45/025 56/104 |
| 2,708,821 A | * | 5/1955 | Heth .................... | A01D 45/025 384/205 |
| 2,777,273 A | * | 1/1957 | Heth .................... | A01D 45/025 56/104 |
| 2,927,414 A | * | 3/1960 | Jones ................... | A01D 45/025 56/119 |
| 3,139,887 A | * | 7/1964 | Karlsson .............. | A01D 45/025 56/104 |
| 3,174,484 A | * | 3/1965 | Anderson ............ | A01D 45/025 56/104 |

(Continued)

FOREIGN PATENT DOCUMENTS

DE     102005009690 A1 *  9/2006   ............. A01D 34/54

*Primary Examiner* — Joseph M Rocca
*Assistant Examiner* — Madeline I Runco
(74) *Attorney, Agent, or Firm* — The Morales Law Firm; Joseph L. Morales, Esq.

(57) ABSTRACT

A corn head roller assembly set having a snout fixed to an end bearing that allows the roller to maintain its rotating condition with respect to its own shaft The end bearing is fixed to a support arm for its arrangement linked to a chassis of a machine. A shaft projects outwards to be associated with a ball joint that is housed in a cavity that is defined between said support arm and an internal face of an end cap that is fixed by threading to the support arm. The support arm includes a transverse conduit that extends to an internal threaded section through which the threaded cap runs. A grub screw in the transverse conduit pushes a locking block.

6 Claims, 6 Drawing Sheets

(56) References Cited

U.S. PATENT DOCUMENTS

| | | | | |
|---|---|---|---|---|
| 3,222,852 | A * | 12/1965 | Ward | A01D 45/025 |
| | | | | 56/104 |
| 3,600,876 | A * | 8/1971 | Tanzer | A01D 45/025 |
| | | | | 56/11.2 |
| 4,219,990 | A * | 9/1980 | Hill | A01D 45/025 |
| | | | | 56/104 |
| 10,136,580 | B2 * | 11/2018 | Capello | A01D 45/025 |
| 2015/0319926 | A1 * | 11/2015 | Madheswaran | A01D 57/22 |
| | | | | 56/104 |
| 2015/0319927 | A1 * | 11/2015 | Madheswaran | A01D 57/22 |
| | | | | 56/110 |
| 2018/0199510 | A1 * | 7/2018 | Ehle | A01D 57/22 |
| 2019/0174675 | A1 * | 6/2019 | Gramm | A01D 45/025 |
| 2019/0230859 | A1 * | 8/2019 | Walker | A01D 34/44 |

* cited by examiner

CORN HEAD ROLLER SNOUT ASSEMBLY SET

SCOPE OF THE INVENTION

The present invention, for which an invention patent is applied for, has as its main object A CORN HEAD ROLLER SNOUT ASSEMBLY SET, which is distinguished because it includes a ball joint at its free end, through which it acquires the property of absorbing misalignments while presenting a great capacity to withstand working conditions with high dust contamination.

In general terms, a corn header is made up of snouts, whose purpose is to guide or direct the plants towards the lifting chains whose function is to transport the spikes towards the auger, and gleaner rollers, two per furrow, which rotate concentrically, pulling the plant downwards, to prevent it (or parts of it) from entering, along with the spike, into the harvester.

For their operation, each of these spike rollers are mounted in a position to be able to rotate on their own shaft, whose free ends define snouts that are arranged on support arms that link them to the chassis of the machine.

In this particular case, the set referred to in this invention has been specially designed for the assembly of the snout of a corn head roller, for which it constitutes a self-aligning support arm, which allows the roller to rotate on its own shaft, through the mechanical link between the outer ring of the bearing associated with the roller, and that of the bearing shaft, which is linked to the self-aligning support arm that is fixed to the chassis of the machine.

To this end, the bearing that makes up the invented set has a shaft that extends to connect with a ball joint, through which it absorbs misalignments during assembly on the arm.

Said shaft may be smooth, arranged with minimal movement, or may have a surface assembled or connected with the internal face of the ball joint, which includes locking resources that prevent unwanted relative movements.

Under the conditions shown, the ball joint is housed in a machined seat cavity in the support arm body, wherein a threaded cap is also included, which remains loose during assembly, allowing movement of the ball joint for aligning the snout of the roller, so that once this alignment is completed, the threaded cap is adjusted so that said ball joint remains fixed to the bearing shaft.

Precisely the special construction condition presented by the aforementioned self-aligning support arm allows the axial and angular adjustment of the bearing, which simplifies the roller snout assembly.

By virtue of the invented set, under the conditions set forth, a new assembly arrangement is possible, through which unwanted overloads in the bearing and in the support arm due to misalignments are avoided.

This is an invention that defines a new combination of means designed to achieve a superior result, being unpredictable and surprising even for an expert in the specialization. Consequently, in addition to being new, its constructive and functional conception shows a clear inventive activity, so that it meets the conditions required by Law to be considered a patent for invention.

PRIOR ART

As it is well known, as the harvester moves in the field, the snouts enter between the rows of corn, at which time each plant is taken by two rotating rollers on the periphery of which there are longitudinal grooves attached for this purpose. In this way, each stem that enters between said rollers is dragged downwards, separating the spike (with a larger diameter than the stems) from the rest of the plant.

Once the spike has been plucked, its entry is guaranteed by the work of two conveyor chains, which lead to the endless feeder of the spikes, husks and also loose stems.

Corn headers usually include pairs of spike rollers, two per furrow, that rotate concentrically, pulling the plant downwards, to prevent it (or parts of it) from entering the harvester together with the spike. These rollers stand out for having a spiral-shaped snout section, which leads to the orderly entry of the plants. This is followed by a traction zone that has grooves, fins or linear blades, which violently lower the cane between the gleaner plates (which have an adjustable separation and are always less than the diameter of the canes); thus enabling the detachment of the spikes.

The present invention refers to the resource that is included for assembling the snout of each corn head roller.

Currently, arms are used that have a cylindrical housing that contains a snout receiving bearing, with lateral compression adjustment systems.

In other cases, cylindrical bushings are included instead of bearings.

However, none of the known options for the assembly of these roller snouts provide the capacity to absorb misalignments.

BRIEF DESCRIPTION OF THE INVENTION—ADVANTAGES

By virtue of the assembly set referred to in the present invention, it is possible to make the axial adjustment of the roller snout and the possibility of aligning the bearing during assembly.

To this end, the assembly set referred to in this invention has developed a novel shielded bearing for the snout of corn header rollers, which is associated with a self-aligning support arm that allows the roller to rotate around its own shaft.

According to this invention, the shielded bearing defines a shaft that projects outwards to be associated with a ball joint mounted on the support arm, through which it is possible to absorb misalignments during assembly.

This invention contemplates that the aforementioned shaft that is projected from the shielded bearing can be a shaft with a smooth, rough or grooved surface, which engages with the internal face of the ball joint that is housed therein.

Other assembly or mutual coupling options are even contemplated, the purpose of which is to prevent undue oscillations or relative movements that generate unwanted wear.

Said ball joint is housed in a cavity defined in the aforementioned support arm, a cavity that is closed with a threaded cap, which remains loose during assembly, allowing the movement of the ball joint to align the set. Once the alignment is completed, the cap is adjusted to ensure that dust or unwanted materials do not enter.

The invention contemplates including a grub screw that is oriented transversely, blocking the rotation of the threaded cap, thereby preventing it from loosening during operation.

Said construction conditions of the support arm containing the aforementioned ball joint associated with the bearing output shaft, present the novelty of allowing axial and angular adjustment of the bearing, which simplifies assembly and avoids overloads on the bearing and on the arm due to misalignments.

It is highlighted that the aforementioned threaded cap, once adjusted, is kept fixed and immovable by means of a grub screw that moves transversely through a duct made on the body of the support arm.

For this purpose, the aforementioned grub screw displaces a locking block, such as a small block, usually made of bronze, pre-machined with the thread of the cap, which moves inside said transverse duct, so that, when the grub screw is adjusted, the small block moves and presses the thread of the cap, locking it, but without damaging it.

When you wish to disassemble the bearing, it is enough to loosen the aforementioned grub screw, which releases the pressure on the locking block and enables the rotation of the threaded cap, allowing it to be removed without any problem.

By means of the assembly set formed in this way, a novel assembly system is established that allows assembly, blocking and disassembling as many times as necessary without damaging the thread of the bearing shaft.

From the above it is clear that the arm has a robust design, allowing quick assembly and disassembly through the use of the ball joint with adjustment nut.

It is also highlighted that this type of adjustment allows adaptation to variations in the dimensions of the chassis of the equipment where it must be assembled, avoiding the use of compensating supplements.

The presence of the aforementioned ball joint allows the bearing and the roller to be easily aligned during assembly, avoiding overloads during operation that could cause premature breakage due to fatigue.

By avoiding localized overloads that cause misalignment of the moving rollers, the useful life of the machine is increased.

It is clarified that the bearing is a bearing selected from the group consisting of deep groove ball bearings, self-aligning ball bearings, spherical roller bearings.

INVENTIVE STEP

No shielded bearing currently known proposes, or even suggests, the constructive solution that arises from what is indicated in the preceding paragraphs, which is why it is a proposal that, in addition to being novel, has a clear inventive step.

SUMMARY DESCRIPTION OF THE FIGURES

To specify the advantages briefly discussed, to which users and experts in the specialty can add many more, and to facilitate the understanding of the constructive, constitutive and functional features of the invented shielded bearing, a preferred embodiment example is described below, which is illustrated, schematically and without a specific scale, in the attached sheets, with the express clarification that, precisely because it is an example, it is not appropriate to assign to it a limiting or exclusive nature of the scope of protection of the present invention, but simply has a merely explanatory and illustrative intention of the basic conception on which it is based.

Figure 6:
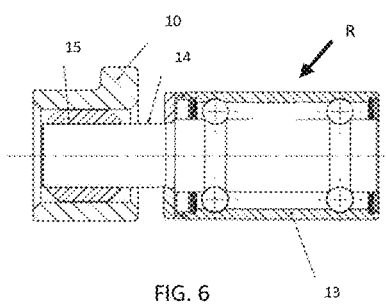
Figure 7:
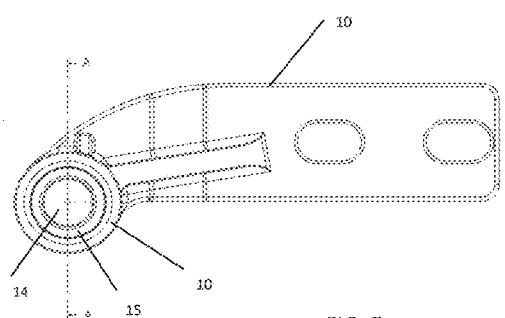

FIG. 6 is a longitudinal section view, according to the vertical section plane A-A indicated in FIG. 7. Showing a simpler linking system, which is another option, but just as efficient for linking the parts. Where the same support acts as a clamp with a screw that links both parts.

FIG. 7 is a side view that represents the same assembly of the previous figures, representing another construction option.

Figure 8:
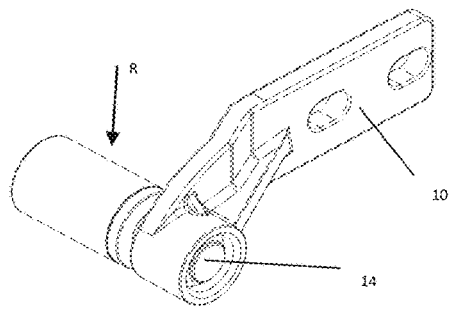

FIG. 8 is a perspective view showing the same assembly set as the previous figure.

Figure 9:
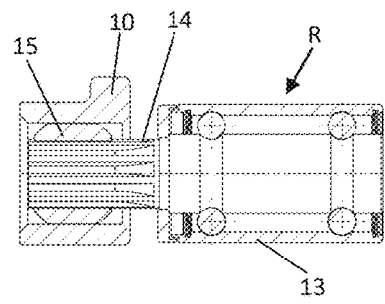
Figure 10:
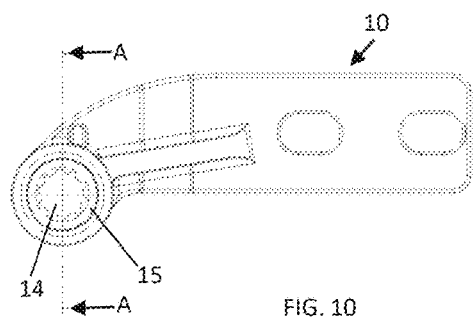

FIG. 9 is a longitudinal section view, according to the vertical section plane A-A indicated in FIG. 10.

FIG. 10 is a side view that represents the same set as the previous figure.

Figure 11:
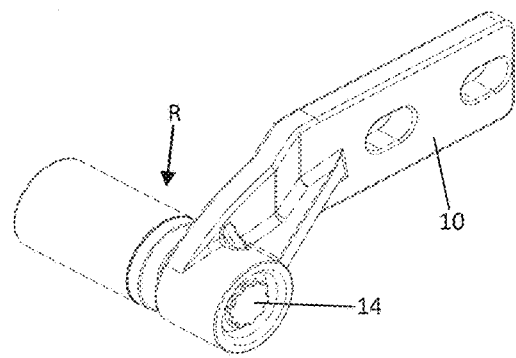

FIG. 11 is a perspective view showing the same assembly set as the previous figure.

Figure 12:
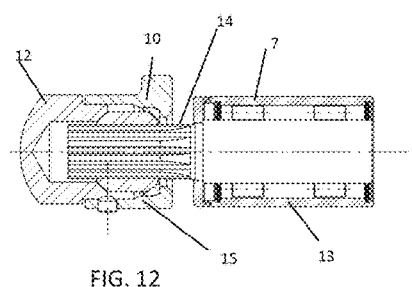
Figure 13:
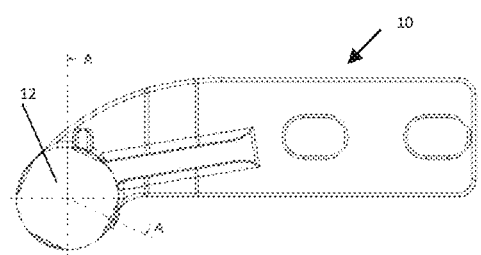

FIG. 12 is a longitudinal section view, according to the vertical section plane A-A indicated in FIG. 13.

FIG. 13 is a side view that represents the same set as the previous figure.

Figure 14:
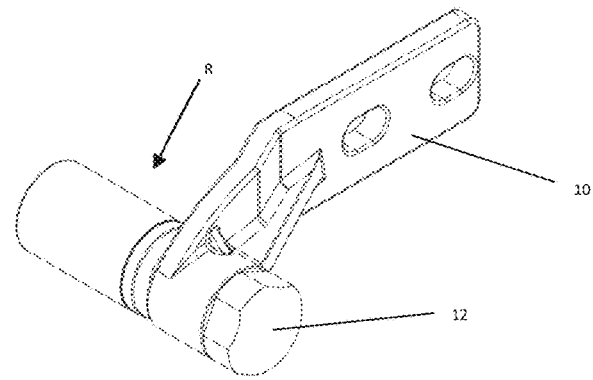

FIG. 14 is a perspective view showing the same assembly set as the previous figure.

It is clarified that, in all figures, the same reference numbers and letters correspond to the same or equivalent parts or elements constituting the set, according to the example chosen for the present explanation of the invented shielded bearing.

DETAILED DESCRIPTION OF A PREFERRED EXAMPLE

As is known, a conventional corn header includes a frame or header row that is basically made up of a pair of lifting chains arranged on an upper plane, carrying the pusher buckets, which are arranged on an upper plane to that of a pair of rotating feeder rollers that extend between both chains, on a lower plane.

Figure 1:
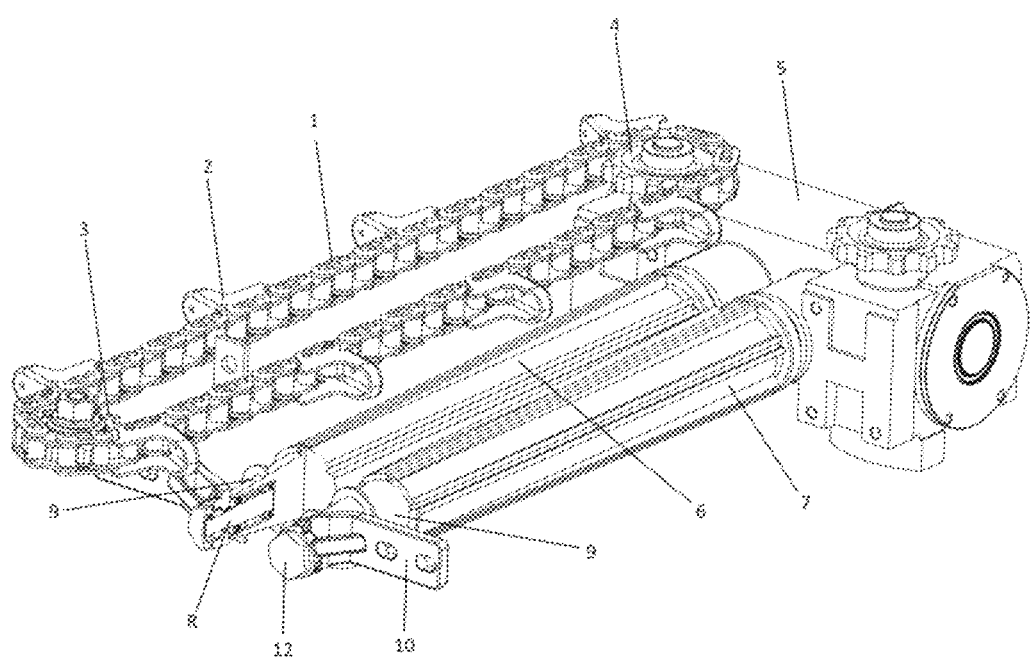
FIG. 1 is a perspective view that shows the row of a corn header, highlighting a pair of rollers, one of which has its snout section partially cut.

FIG. 1 represents only one of the lifting chains, indicated with the reference (1), with its buckets (2). It can be seen that said lifting chain extends between a control gear (4) arranged at the proximal end, the control box (5), and a tensioning gear (3) arranged at a distal end with respect to the same control box (5).

By means of the rotation of the control gears in the opposite direction to the movement of the material being transferred, linear movement is generated, longitudinally to the row, for which each lifting chain must be properly tensioned by the action of the aforementioned tensioning gear (3).

The same FIG. 1 shows the presence of a pair of rotating rollers (6) and (7) that project parallel, on the same plane and with a slight mutual separation. They project from the aforementioned control box (5), and include a snout section (9) with annular ribs in relief, which is mounted on the support arm (10).

This FIG. 1 shows that the snout (9) of the roller (6) is represented partially cut, making it possible to observe the presence of the shielded bearing (R) that makes up the assembly set of this invention, through which the assembly of the snout (9) of the roller (6) on the support arm (10) is established, maintaining the rotating condition.

It can be seen that said assembly of the snout (9) of each roller is closed with a threaded cap (12) arranged at the free end of the set.

Figure 2:
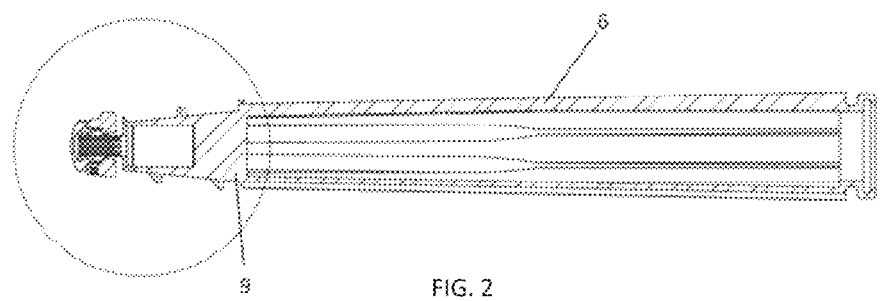
FIG. 2 is a longitudinal sectional view that schematically represents a corn head roller with its snout mounted on a support arm.
Figure 3:
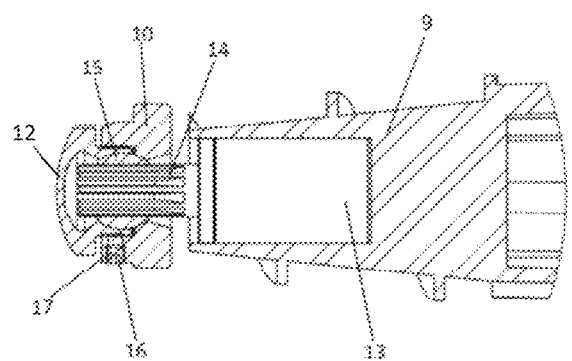
FIG. 3 is an enlarged detail in longitudinal section where the assembly set of this invention stands out, arranged on the snout of a corn head roller, in a preferred embodiment.

Looking now at FIGS. 2 and 3, it is possible to see how the assembly set referred to in the present invention is constituted.

Especially in FIG. 3 it can be seen that the snout (9) of the roller (6) is fixed to the outer ring (13) of the bearing (R), so that it rotates with respect to the shaft (14) that is projected from the inner ring of the same bearing (R).

According to this invention, said shaft (14) is associated with the ball joint (15) which is arranged in a cavity substantially defined in the body of the support arm (10).

It is highlighted that the aforementioned shaft (14) may be smooth, grooved or with another surface conformation, for its assembly or coupling with the internal surface of the ball joint (15). These FIGS. 2 and 3 represent the case where the same shaft (14) has its surface with longitudinal grooves.

The set is completed with the aforementioned threaded cap (12) that rests on the aforementioned ball joint (15) so that, with its threaded adjustment on the internal wall of the support arm (10), it can put pressure thereon until preventing its movement.

By means of the invented assembly set constituted in this way, the advantage of constituting a self-aligning assembly clearly arises, since the presence of the ball joint (15) allows the shaft (14) to be aligned during assembly, before adjusting the threaded cap (12). Once the operator establishes the alignment, the operator proceeds to adjust the cap that presses the ball joint until its immobilization.

Figure 5:
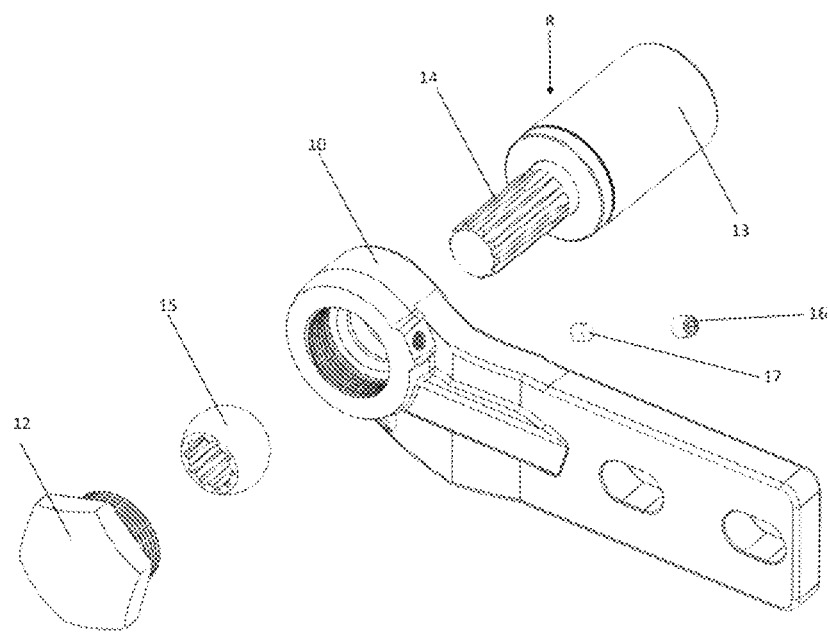
FIG. 5 is an exploded perspective of the same set of the present invention, in a preferred embodiment.

Looking at FIGS. 3 and 5, it can be seen that the incorporation of a grub screw (16) housed in a transverse hole made on the body of the support arm (10) is contemplated, through which it is possible to move a block lock (17) that has a pre-machined face with the thread of the cap (12), whose function is to prevent the ball joint from moving after being adjusted, from rotating improperly and from becoming loose from its fixation, during the operation of the machine.

Figure 4:
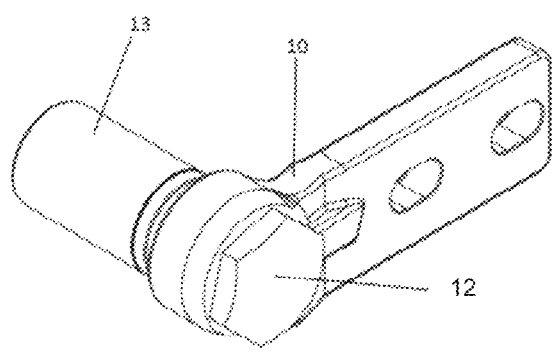
FIG. 4 is a perspective view showing the shielded bearing that makes up the assembly set of this invention arranged on the snout support arm.

FIGS. 4 and 5 make it possible to observe more clearly the combination of means that make up the assembly set referred to in this invention, being it possible to see that, to produce the aforementioned self-alignment of the bearing (R), between the internal face of the threaded cap (12) and the cavity defined in the support arm, the seat cavity of the ball joint (15) associated with the shaft (14) is formed.

Looking now at FIGS. 6, 7 and 8, it is possible to see that, within the same constructive conception, the invented assembly set contemplates the option that the aforementioned shaft (14) is a smooth shaft, which is supported and fixed on the internal cylindrical surface of the ball joint (15).

Likewise, FIGS. 9, 10 and 11 represent the same assembly set where the aforementioned shaft (14) is a splined shaft, which is coupled to the internal surface of the ball joint (15), while the support arm (10) acts as a mounting clamp and adjusts by means of a set screw.

Finally, FIGS. 12, 13 and 14 show that, as the cylindrical surface of the aforementioned shaft (14) is grooved, the final adjustment and alignment occurs through the aforementioned threaded cap (12).

Obviously the invented set can also use bearings with any type of rolling element, restraints, and/or construction features.

Having described and exemplified the nature and main object of the present invention, as well as the way in which it can be put into practice, it is declared to be claimed as property and exclusive rights:

1. A corn head roller assembly set, wherein a snout is fixed to an end bearing that allows a roller to maintain a rotating condition with respect to a shaft, wherein the end bearing is fixed to a support arm linked to a chassis of a machine; characterized in that from an inner ring of the end bearing, a shaft is projected outwardly to be associated with a ball joint that is housed in a cavity that is defined between the support arm and an internal face of an end cap that is fixed by threading on the support arm; the support arm includes a transverse conduit that extends to an internal threaded section through which the end cap runs, and where a grub screw in the transverse conduit pushes a locking block.

2. The corn head roller snout assembly set, according to claim 1, characterized in that the shaft that projects outward from the inner ring is smooth.

3. The corn head roller snout assembly set, according to claim 1, characterized in that the shaft that projects outward from the inner ring is splined.

4. The corn head roller snout assembly set, according to claim 1, characterized in that the shaft that projects outward from the inner ring is rough.

5. The corn head roller snout assembly set, according to claim 1, characterized in that the shaft that projects outward from the inner ring is cylindrical.

6. The corn head roller snout assembly set, according to claim 1, characterized in that the bearing is selected from the group consisting of deep groove ball bearings, self-aligning ball bearings, spherical roller bearings, angular contact bearings, cylindrical roller bearings, needle roller bearings, and spherical roller bearings.

\* \* \* \* \*